(12) United States Patent
Nappo et al.

(10) Patent No.: US 9,931,749 B2
(45) Date of Patent: Apr. 3, 2018

(54) REMOTE PRESENCE ROBOTIC SYSTEM (71) Applicants: John C. Nappo, Philadelphia, PA (US); Daleroy Sibanda, Philadelphia, PA (US); Emre Tanirgan, Philadelphia, PA (US); Peter A. Zachares, Philadelphia, PA (US)

(72) Inventors: John C. Nappo, Philadelphia, PA (US); Daleroy Sibanda, Philadelphia, PA (US); Emre Tanirgan, Philadelphia, PA (US); Peter A. Zachares, Philadelphia, PA (US)

(*) Notice: Subject to any disclaimer, the term of this patent is extended or adjusted under 35 U.S.C. 154(b) by 11 days.

(21) Appl. No.: 15/099,314

(22) Filed: Apr. 14, 2016

(65) Prior Publication Data

US 2016/0303735 A1 Oct. 20, 2016

Related U.S. Application Data

(60) Provisional application No. 62/148,145, filed on Apr. 15, 2015.

(51) Int. Cl.
| | |
|---|---|
| *B25J 9/16* | (2006.01) |
| *B25J 19/02* | (2006.01) |
| *G05D 1/00* | (2006.01) |
| *B25J 5/00* | (2006.01) |
| *B25J 13/00* | (2006.01) |
| *G06F 3/01* | (2006.01) |

(52) U.S. Cl.
CPC .............. *B25J 9/161* (2013.01); *B25J 5/007* (2013.01); *B25J 9/1689* (2013.01); *B25J 13/00* (2013.01);
(Continued)

(58) Field of Classification Search
CPC . B25J 9/161; B25J 5/007; B25J 9/1689; B25J 13/00; B25J 19/023; B25J 13/88; B25J 19/04; B25J 3/00; G05D 1/0038; G05D 2201/0211; G06F 3/012; G05B 2219/35482; G05B 2219/40298; G05B 2219/40414; G05B 2219/40146; G05B 2219/40169; Y10S 901/01
(Continued)

(56) References Cited

U.S. PATENT DOCUMENTS 5,807,284 A * 9/1998 Foxlin .................. A61B 5/1114
128/897
6,016,385 A * 1/2000 Yee .......................... B25J 3/04
446/327
(Continued)

OTHER PUBLICATIONS

Ohannessian, "NASA Uses Kinect and Oculus Rift to Control Robot," Tom's Guide, p. 1-4 (Jun. 13, 2016).

*Primary Examiner* — Bao Long T Nguyen
(74) *Attorney, Agent, or Firm* — Jenkins, Wilson, Taylor & Hunt, P.A.

(57) ABSTRACT

A remote presence system includes a robot, a headset, and a computer system. The robot includes a camera mounted on a motorized manipulator and a control system. The headset includes a head position sensor and a display. The computer system configured to perform operations including: receiving head movement data indicative of head movements of a user wearing the headset from the head position sensor; causing, using the head movement data, the control system of the robot to move the motorized manipulator so that the camera mimics the head movements of the user; and establishing a video feed from the camera to the display.

15 Claims, 8 Drawing Sheets

(52) U.S. Cl.
CPC .......... *B25J 19/023* (2013.01); *G05D 1/0038* (2013.01); *G06F 3/012* (2013.01); *G05B 2219/35482* (2013.01); *G05B 2219/40298* (2013.01); *G05D 2201/0211* (2013.01); *Y10S 901/01* (2013.01)

(58) Field of Classification Search
USPC ............... 700/257, 250, 253, 258; 901/1; 318/568.16, 568.25; 701/2
See application file for complete search history.

(56) References Cited

U.S. PATENT DOCUMENTS

| | | | | |
|---|---|---|---|---|
| 6,148,100 | A * | 11/2000 | Anderson | G02B 27/0093 318/567 |
| 6,523,629 | B1 * | 2/2003 | Buttz | B60D 1/00 180/14.2 |
| 8,376,803 | B2 * | 2/2013 | Oonaka | A63H 3/28 379/38 |
| 8,831,769 | B2 * | 9/2014 | Kim | G05B 19/4067 219/121.63 |
| 9,031,809 | B1 * | 5/2015 | Kumar | G01C 21/165 702/150 |
| 9,566,711 | B2 * | 2/2017 | Smith | G05B 19/41815 |
| 2009/0195652 | A1 * | 8/2009 | Gal | B60R 1/00 348/148 |
| 2012/0287284 | A1 * | 11/2012 | Jacobsen | G06F 1/163 348/158 |
| 2016/0139752 | A1 * | 5/2016 | Shim | G06F 3/0483 715/771 |
| 2016/0235323 | A1 * | 8/2016 | Tadi | A61B 5/7285 |

* cited by examiner

REMOTE PRESENCE ROBOTIC SYSTEM

PRIORITY CLAIM

This application claims the benefit of U.S. Provisional Patent Application Ser. No. 62/148,145, filed Apr. 15, 2015; the disclosure of which is incorporated herein by reference in its entirety.

TECHNICAL FIELD

This specification relates generally to robotic systems, e.g., robotic systems for remote presence applications.

BACKGROUND

Some conventional telepresence systems use robots that are designed for light to moderate indoor usage such as within workplace settings. User control in those systems can be minimal, e.g., by being confined to fixed camera devices or by using mobile robots "driven" by users on conventional interfaces native to personal computers. Some robotic platforms are designed without regard to social interaction. For example, some systems use a screen mounted on a pole, set on a pair of wheels. While these systems can be effective in achieving remote presence, they do not exploit the human tendency to anthropomorphize inanimate objects and machines, and thus fail to take full advantage of the scenario established by human-robot interaction (HRI). These systems can also fall short in capturing the nuances of human movement and capturing the "essence" of human beings.

SUMMARY

A remote presence system includes a robot, a headset, and a computer system. The robot includes a camera mounted on a motorized manipulator and a control system. The headset includes a head position and orientation sensor and a display. The computer system is configured to perform operations including: receiving head movement data indicative of head movements of a user wearing the headset from the head position sensor; causing, using the head movement data, the control system of the robot to move the motorized manipulator so that the camera mimics the head movements of the user; and establishing a video feed from the camera to the display. In some examples, the system captures the full six degrees of freedom of movement of the human head, e.g. roll, pitch, yaw, x, y, and z maneuverability.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
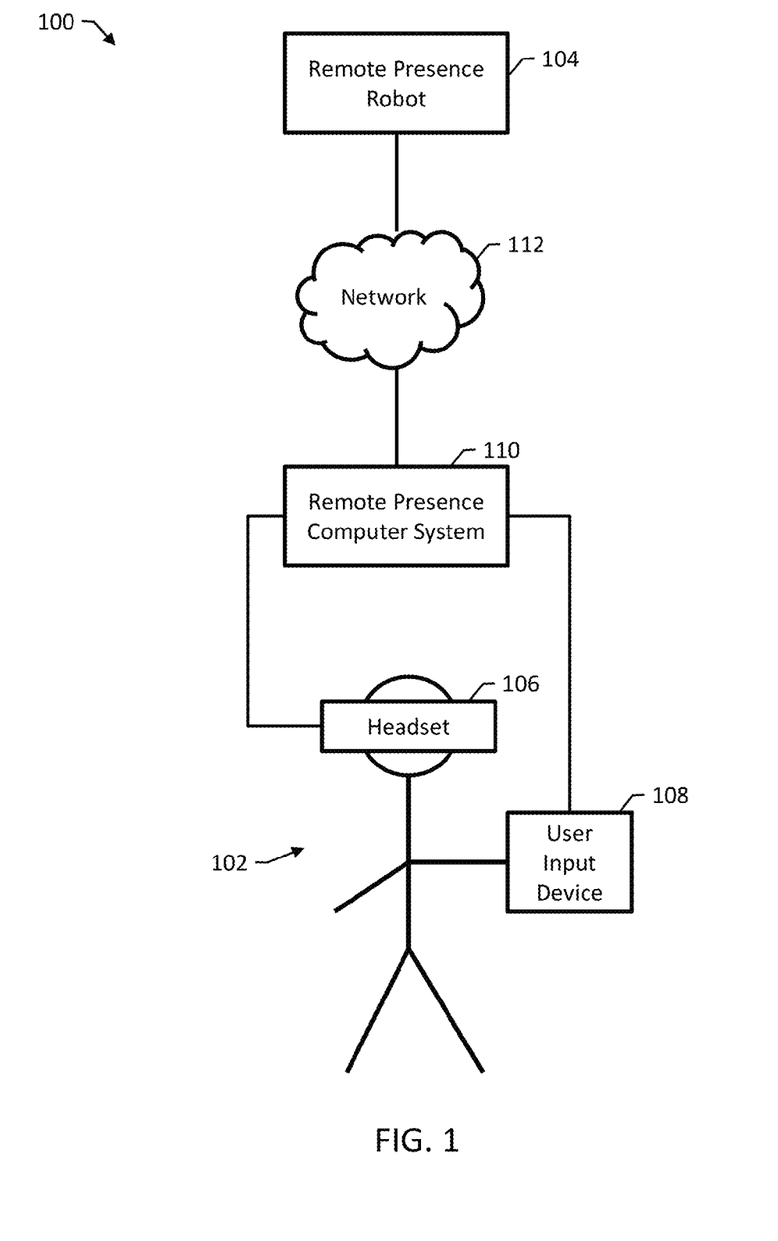
FIG. 1 is a block diagram of a remote presence system.

FIG. 1 is a block diagram of a remote presence system 100. The system includes a user 102 wearing a headset, a remote presence robot 104, and a remote presence computer system 110. The remote presence computer system 110 is configured to communicate with the robot over a data communications network 112. The user can use an optional user input device 108, e.g., to control certain movements of the robot 104.

In operation, the user sees, on a display of the headset 106, what the robot 104 sees using a camera system on the robot 104. The camera system on the robot 104 mimics the user's 102 head movements by virtue of a position and orientation sensor on the headset 106 and a control module executing on the remote presence computer system 110, which gives the user 102 the experience of being in the same location as the robot 104. The system 100 can be configured for real-time or near real-time control of the robot 104.

The user input device 108 can be a joystick, a gaming controller, or any appropriate device for controlling a robot. The user 102 can use the user input device 108 to cause the robot 104 to traverse the robot's environment.

The system 100 can be used for discovery and exploration of remote locations. For example, the system 100 can be used to bring the experience of travel to wide audiences, and the system 100 can be used in first response situations. Through a real-time interface that manipulates the robot by tracking nuanced head movement in all six degrees of freedom and transmits visual and audio data back to the user with a minimum amount of latency, individuals can visit spaces both familiar and foreign, experiencing them as if they were physically present.

Figure 2:
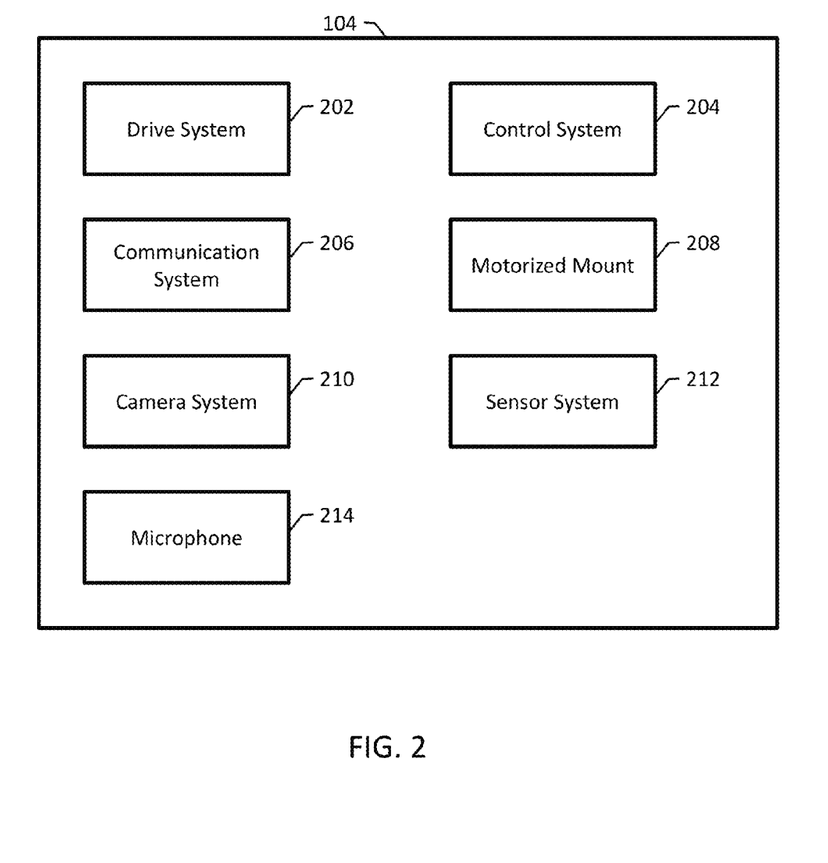
FIG. 2 is a block diagram illustrating components of an example robot.

FIG. 2 is a block diagram illustrating components of an example robot 104. The robot includes a drive system 202, a control system 204, and a communication system 206.

For example, the drive system 202 can be a differential drive system including at least two wheels and a respective motor for each wheel. The control system 204 can be a computing system comprising one or more processors and memory storing instructions that, when executed by the processors, cause the processors to control the robot 104. The communication system 206 can be, e.g., a radio transceiver, or any appropriate mobile communications transceiver.

The robot 104 includes a motorized manipulator 208 and a camera system on the motorized manipulator 208. For example, the motorized manipulator 208 can include rotating motors configured to control roll, pitch, and yaw of the camera system 210 and linear actuators configured to move the camera system 210 both vertically and within a horizontal plane.

In some examples, the motorized manipulator 208 is configured to meet design criteria for a comfortable user experience. For example, the motorized manipulator 208 can be configured for rotation of roll of up to 400 degrees/sec (1.11 Hz), pitch of up to 400 degrees/sec (1.11 Hz), and yaw up to 700 degrees/sec (1.95 Hz). The motorized manipulator can be configured for translation in the x dimension at 1.8 meters/sec over 80 cm, translation in the y dimension at 1.8 meters/sec over 95 cm, and in the z dimension at 1.2 meters/sec over 68 cm.

The camera system 210 can include a pair of cameras mounted side by side on the motorized manipulator 208 for creating a stereoscopic display experience for the user. The robot 104 includes an optional sensor system 212 and an optional microphone 214. The sensor system 212 can include a three-axis accelerometer and a three-axis gyroscope. The sensor system 212 can also include encoders or other appropriate sensors to track the movement of the motorized manipulator 208. The microphone 214 can be used to establish an audio feed to augment a video feed from the camera system 210.

In some examples, the robot 104 is configured to mimic rotation axes of the human head, with roll and yaw intersecting at a single point, and pitch offset as in a human head. For example, the pitch axis of the motorized manipulator can be aligned, relative to the roll and yaw axes, as it is typically aligned through the human head interaural axis.

Figure 3A:
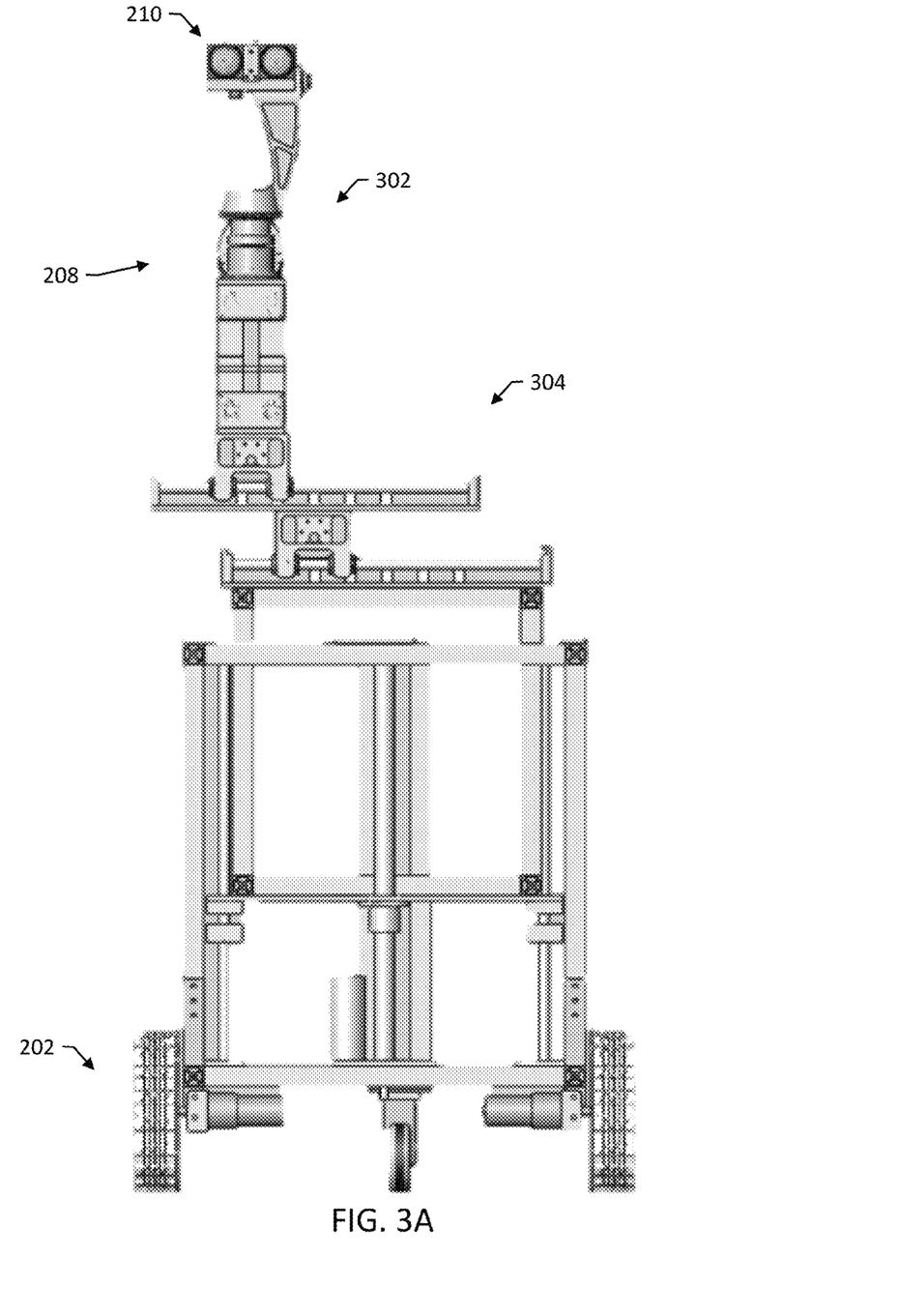
FIGS. 3A-C are front, side, and perspective views of an example robot.
Figure 3B:
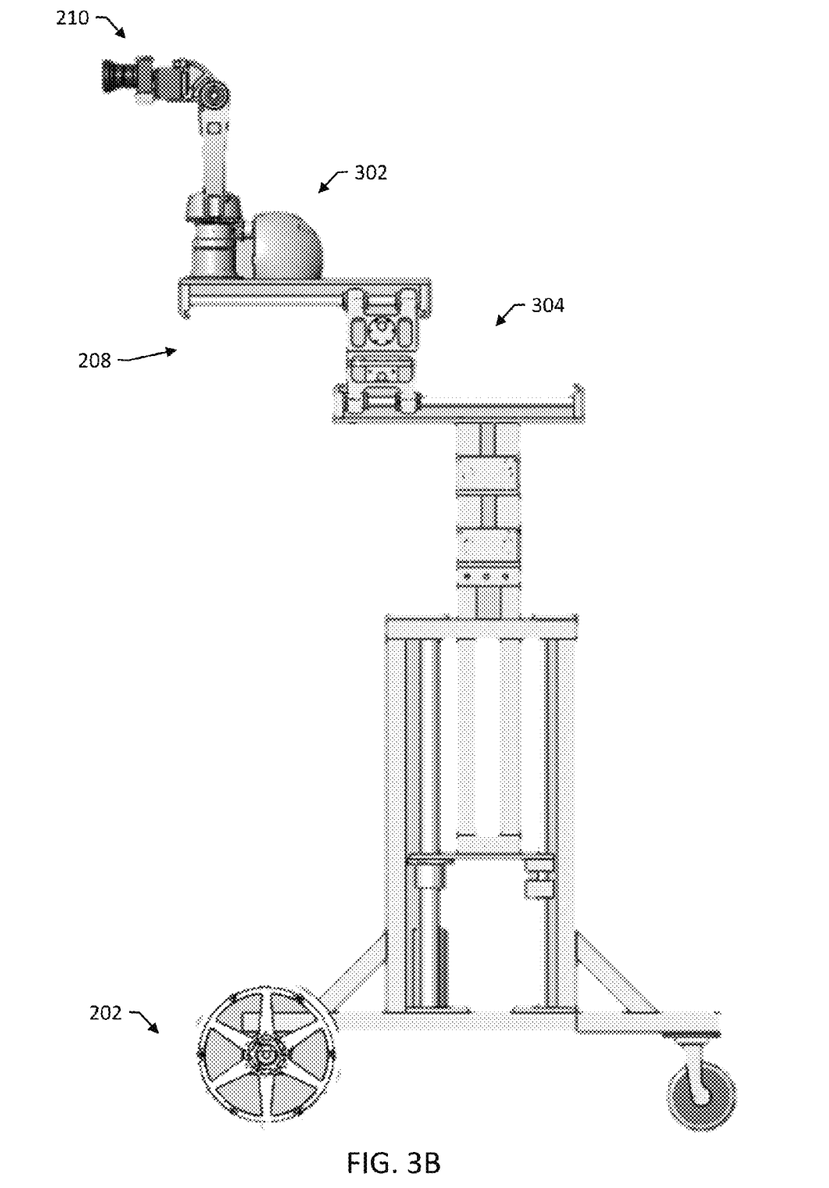
Figure 3C:
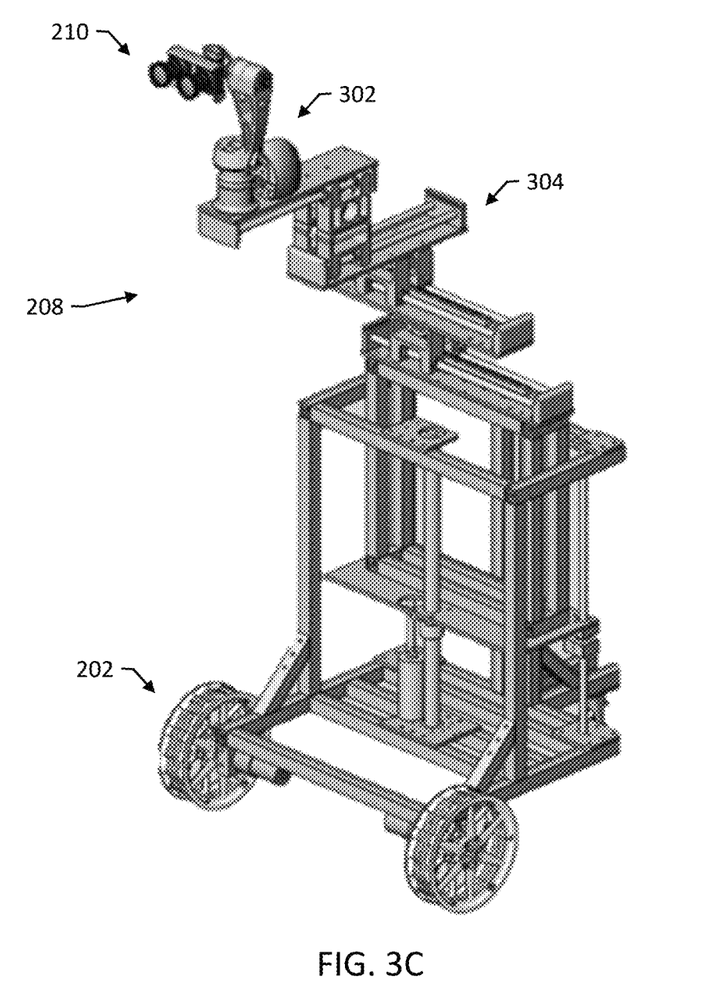

FIGS. 3A-C are front, side, and perspective views of an example robot 104. The robot includes a drive system 202, a motorized manipulator 208, and a camera system 210. The motorized manipulator 208 includes a gimbal 302 for controlling the roll, pitch, and yaw of the camera system 210. In some examples, the gimbal 302 can be implemented using a rack and pinion system, e.g., for translation along the x and y axes. The motorized manipulator 208 also includes a series of stages to move the camera system 210. The stages can be moved left to right, front to back, and up and down by a number of linear actuators, e.g., lead screws.

Figure 4:
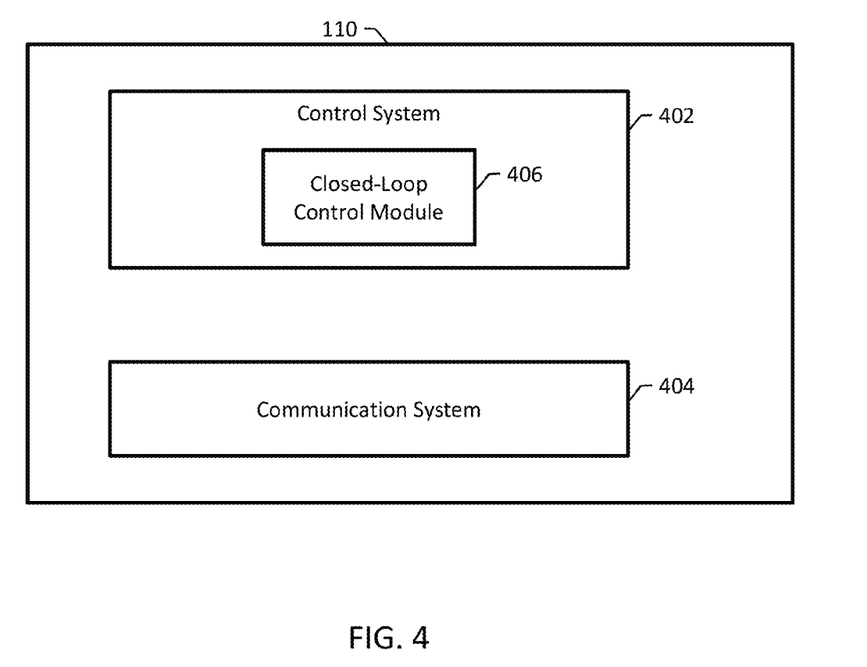
FIG. 4 is a block diagram of an example remote presence computing system.

FIG. 4 is a block diagram of an example remote presence computing system 110. The computing system 110 can include one or more processors and memory storing instructions that, when executed by the processors, cause the processors to establish a remote presence session for a user 102. The computing system 110 can be located near the user 102, on or near the robot 104, at a location remote to the user 102 and the robot 104, or distributed between multiple locations and connected by a data communications network.

In some examples, the computing system 110 is configured, by virtue of appropriate programming, to maintain a reservation calendar for the robot 104. The computing system 110 can provide a user interface for the reservation calendar and users can reserve blocks of time during which the users can control the robot.

The computing system 110 includes a control system 402 and a communication system 404. The communication system 404 can be used to establish a communications channel with the robot 104, including establishing a video feed and an optional audio feed. In some examples, the computing system 110 routes the video feed from the robot 104 to the headset 106; in some other examples, the robot transmits the video feed directly to the headset 106 or transmits to the headset 106 using another system. The control system 402 can send instructions to the robot 104 using the communication system 404 and receive movement data from the robot 104 using the communication system 404.

The control system 402 can include a closed-loop control module 406. For example, the closed-loop control module 406 can implement a proportional-integral-derivative (PID) controller to cause the robot 104 to mimic the head movements of the user 102. The computing system 110 can supply head movement data from the headset 106 and camera movement data from the robot 104 to the closed-loop control module.

Figure 5:
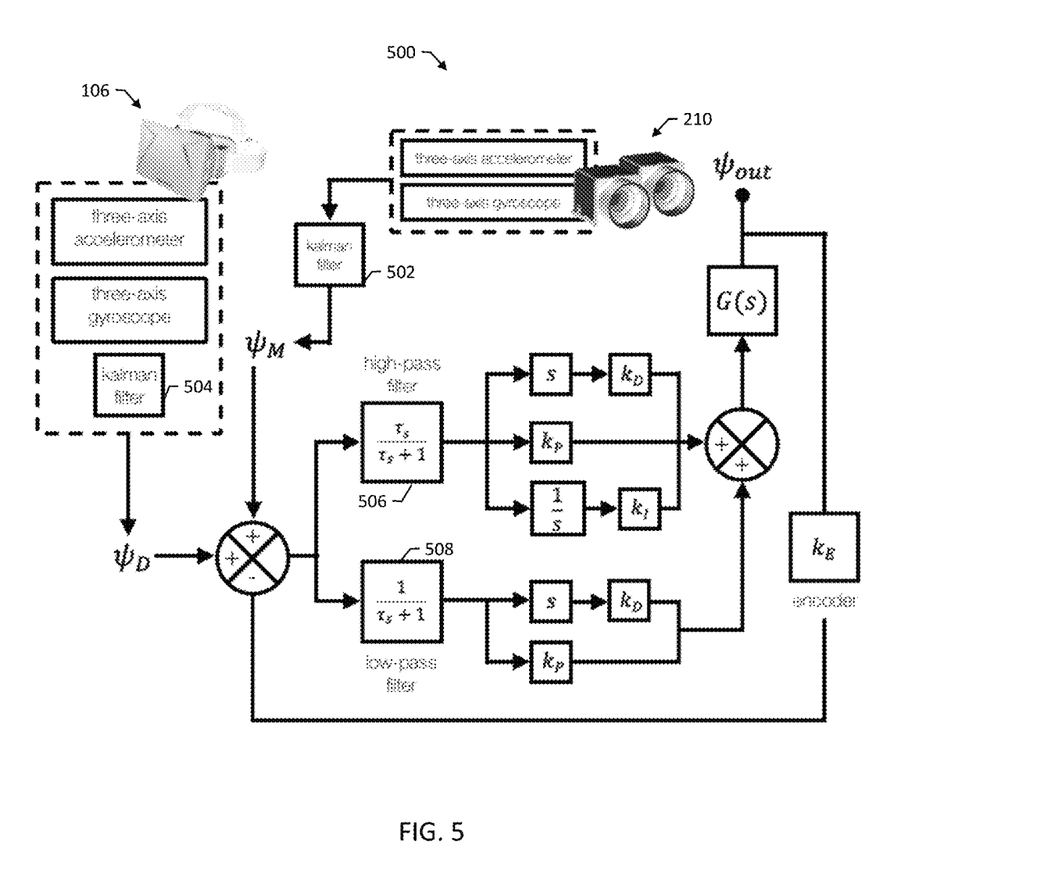
FIG. 5 is a block diagram of an example closed-loop control algorithm.

FIG. 5 is a block diagram of an example closed-loop control algorithm 500 to control the motorized manipulator within one degree of freedom. The closed-loop control module 406 can implement the control algorithm 500 for each of roll, yaw, pitch, and x, y, and z positions of the motorized manipulator 208.

The system receives head movement data from the headset 106. For example, the system can receive head movement data from a position sensor on the headset 106, e.g., including a three-axis accelerometer and a three-axis gyroscope. The system processes the head movement data with a Kalman filter 504, which can be useful to reduce noise. In some examples, the headset 106 includes a Kalman filter 504 built into the device itself. Then, the computing system 104 can lack a separate Kalman filter. The system receives camera movement data from the camera system 210. For example, the system can receive camera movement data from a position sensor on the camera system 210, e.g., including a three-axis accelerometer and a three-axis gyroscope. The system processes the camera movement data with a Kalman filter 502, which can be useful to reduce noise.

The movement data can be combined and passed through a high-pass filter 506 and a low-pass filter 508 configured to regulate the speed and frequency of movement of the motorized manipulator 208. The system can also receive data from an optional sensor on the robot 104 such as an encoder. The system outputs a commanded position for the motorized manipulator 208.

Figure 6:
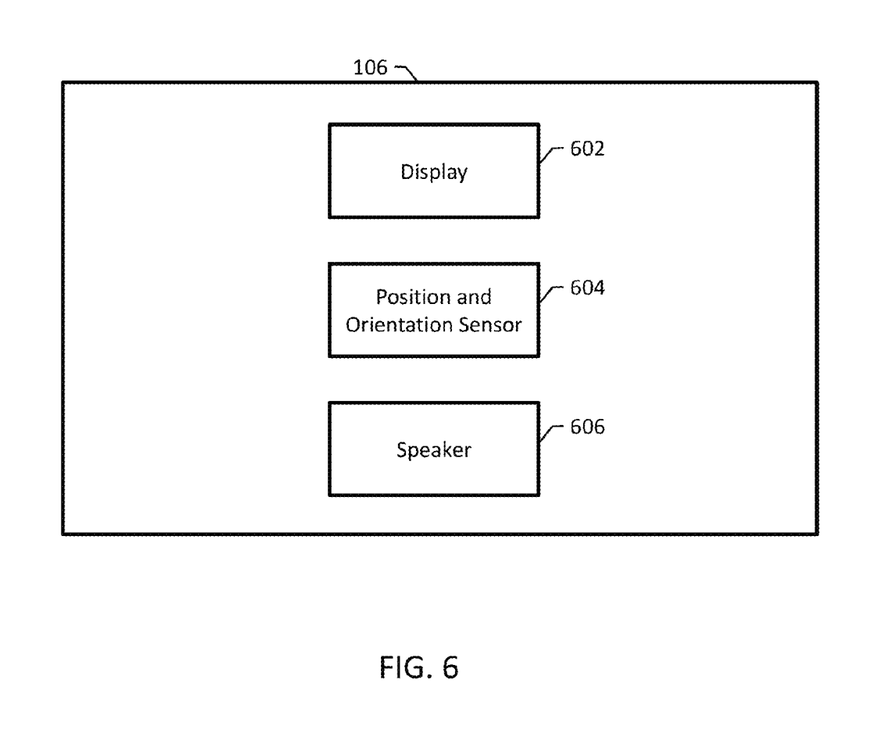
FIG. 6 is a block diagram of an example headset.

FIG. 6 is a block diagram of an example headset 106. The headset 106 includes a display 602, a position and orientation sensor 604, and an optional speaker 606. The display 602 can include first and second display screens, one for each eye of the user, so that first and second video feeds from the robot can create a stereoscopic display experience for the user. The position sensor 604 can include a three-axis accelerometer and a three-axis gyroscope. The speaker 606 can produce sound from an audio feed from the robot 104. For example, the speaker 606 can be a pair of headphones.

In some examples, the position and orientation sensor 604 can be separate from the headset, either whole or in part. For example, the position sensor can be a separate infrared (IR) camera that is mounted externally, e.g., on the user's computer monitor. The IR camera can track IR markers on the headset 106 itself to provide position data. In those examples, a separate orientation sensor can be mounted on the headset 106.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A system comprising:
   a robot comprising:
   a motorized manipulator;
   a camera mounted on the motorized manipulator;

a camera position sensor; and
a control system configured to cause the motorized manipulator to move the camera;
a headset comprising:
a head position and orientation sensor; and
a display; and
a computer system configured to perform operations comprising:
receiving head movement data indicative of head movements of a user wearing the headset from the head position and orientation sensor;
causing, using the head movement data, the control system of the robot to move the motorized manipulator so that the camera mimics the head movements of the user, wherein causing the control system of the robot to move the motorized manipulator so that the camera mimics the head movements of the user comprises supplying camera movement data from the camera position sensor and the head movement data to a closed-loop control module; and
establishing a video feed from the camera to the display.

2. The system of claim 1, wherein:
the robot comprises first and second cameras mounted side by side on the motorized manipulator;
the display comprises first and second display screens, one for each eye of the user; and
establishing the video feed comprises establishing a first video feed from the first camera to the first display screen and establishing a second video feed from the second camera to the second display screen, thereby creating a stereoscopic display experience for the user.

3. The system of claim 1 comprising a user input device, wherein the robot comprises a drive system, and wherein the operations of the computer system comprise:
receiving input from the user input device; and
causing the control system of the robot to move the robot using the drive system based on the input from the user input device.

4. The system of claim 3, wherein the drive system comprises a differential drive system comprising at least two wheels and a respective motor for each wheel.

5. The system of claim 1, wherein the closed-loop control module comprises a low-pass filter and a high-pass filter configured to regulate the speed and frequency of movement of the motorized manipulator.

6. The system of claim 1, wherein the closed-loop control module comprises a head Kalman filter configured to filter the head movement data and a camera Kalman filter configured to file the camera movement data.

7. The system of claim 1, wherein the head position sensor and the camera position sensor each comprises a three-axis accelerometer and a three-axis gyroscope.

8. The system of claim 1, wherein the motorized manipulator comprises a plurality of rotating motors configured to control roll, pitch, and yaw of the camera.

9. The system of claim 1, wherein the motorized manipulator comprises a plurality of linear actuators configured to move the camera both vertically and within a horizontal plane.

10. The system of claim 1, wherein the robot comprises a microphone, and wherein the headset comprises one or more speakers, and wherein the operations of the computer system comprise establishing an audio feed from the microphone to the one or more speakers.

11. The system of claim 1, wherein causing the control system of the robot to move the motorized manipulator so that the camera mimics the head movements of the user comprises sending instructions based on the head movement data to the control system over a data communications network comprising at least one wireless communications link.

12. The system of claim 1, wherein causing the control system of the robot to move the motorized manipulator so that the camera mimics the head movements of the user comprises causing the camera to mimic the head movements of the user in real-time or near real-time.

13. The system of claim 1, wherein the operations of the computer system comprise maintaining a reservation calendar for the robot and providing a user interface for the reservation calendar configured to allow a plurality of users to reserve blocks of time during which the users can control the robot.

14. A method comprising:
receiving, by a computer system, head movement data indicative of head movements of a user wearing a headset from a head position sensor on the headset;
causing, by the computer system using the head movement data, a control system of a robot to move a motorized manipulator of the robot so that a camera mounted on the motorized manipulator mimics the head movements of the user, wherein causing the control system of the robot to move the motorized manipulator so that the camera mimics the head movements of the user comprises supplying camera movement data from a camera position sensor of the robot and the head movement data to a closed-loop control module; and
establishing, by the computer system, a video feed from the camera to a display of the headset.

15. A non-transitory computer readable medium having stored thereon executable instructions that when executed by one or more processors of a computer control the computer to perform steps comprising:
receiving head movement data indicative of head movements of a user wearing a headset from a head position sensor on the headset;
causing, using the head movement data, a control system of a robot to move a motorized manipulator of the robot so that a camera mounted on the motorized manipulator mimics the head movements of the user, wherein causing the control system of the robot to move the motorized manipulator so that the camera mimics the head movements of the user comprises supplying camera movement data from a camera position sensor of the robot and the head movement data to a closed-loop control module; and
establishing a video feed from the camera to a display of the headset.

* * * * *